US006673503B2

(12) United States Patent
Wagner et al.

(10) Patent No.: US 6,673,503 B2
(45) Date of Patent: Jan. 6, 2004

(54) ENERGY ACTIVATED ELECTROGRAPHIC PRINTING PROCESS

(76) Inventors: Barbara Wagner, 1477 Oaklanding Rd., Mt. Pleasant, SC (US) 29464; Rebecca Silveston, 4 Shaftsbury La., Charleston, SC (US) 29401; Ming Xu, 2808 Gaston Gate, Mt. Pleasant, SC (US) 29464

( * ) Notice: Subject to any disclaimer, the term of this patent is extended or adjusted under 35 U.S.C. 154(b) by 0 days.

(21) Appl. No.: 09/978,190

(22) Filed: Oct. 15, 2001

(65) Prior Publication Data

US 2002/0155367 A1 Oct. 24, 2002

Related U.S. Application Data

(63) Continuation-in-part of application No. 09/556,176, filed on Apr. 20, 2000, now Pat. No. 6,341,856, and a continuation-in-part of application No. 09/156,871, filed on Sep. 18, 1998, now Pat. No. 6,402,313, which is a division of application No. 09/073,963, filed on May 6, 1998, now abandoned, which is a division of application No. 08/309,933, filed on Nov. 7, 1994, now Pat. No. 5,522,317, application No. 09/978,190, which is a continuation-in-part of application No. 09/322,737, filed on May 28, 1999, now Pat. No. 6,348,939.
(60) Provisional application No. 60/275,228, filed on Mar. 12, 2001.

(51) Int. Cl.$^7$ .................... G03G 13/20; G03G 13/14
(52) U.S. Cl. .................. 430/124; 430/126; 430/130; 347/112
(58) Field of Search .................. 430/124, 126, 430/130; 347/112, 240, 251; 101/DIG. 37

(56) References Cited

U.S. PATENT DOCUMENTS

| | | | |
|---|---|---|---|
| 4,021,591 A | 5/1977 | DeVries et al. | |
| 4,058,644 A | 11/1977 | DeVries et al. | |
| 4,078,886 A | 3/1978 | DeFago et al. | |
| 4,097,229 A | 6/1978 | Koller et al. | |
| 4,167,392 A | 9/1979 | DeFago et al. | |
| 4,224,358 A | 9/1980 | Hare et al. | |
| 4,357,441 A | 11/1982 | Hamamura et al. | |
| 4,420,307 A | 12/1983 | Gorondy | |
| 4,421,515 A | 12/1983 | Gorondy | |
| 4,421,517 A | 12/1983 | Gorondy | |
| 4,549,824 A | 10/1985 | Sachdev et al. | |
| 4,589,920 A | 5/1986 | Kanada et al. | |
| 4,605,418 A | 8/1986 | Christie et al. | |
| 4,664,670 A | 5/1987 | Mehl et al. | |
| 4,681,828 A | * 7/1987 | Alexandrovich et al. | ..... 430/97 |
| 4,694,302 A | 9/1987 | Hackleman et al. | |
| 4,725,849 A | 2/1988 | Koike et al. | |
| 4,730,021 A | 3/1988 | Zom et al. | |
| 4,732,616 A | 3/1988 | Kondo et al. | |
| 4,749,784 A | 6/1988 | Feeman et al. | |
| 4,750,935 A | 6/1988 | Prochaska et al. | |
| 4,773,953 A | 9/1988 | Hare | |
| 4,839,770 A | 6/1989 | Ruta | |
| 4,847,318 A | 7/1989 | Dennis | |
| 4,849,262 A | 7/1989 | Uhl et al. | |
| 4,874,798 A | 10/1989 | Koleske et al. | |
| 4,968,575 A | 11/1990 | Matsumura et al. | |
| 5,035,970 A | 7/1991 | Hsieh et al. | |
| 5,092,757 A | 3/1992 | Stein et al. | |
| 5,112,715 A | 5/1992 | DeMejo et al. | |
| 5,116,712 A | 5/1992 | Nakamura et al. | |

(List continued on next page.)

FOREIGN PATENT DOCUMENTS

| | | |
|---|---|---|
| EP | A 27 27 223 | 12/1978 |
| EP | a-466 503 | 1/1992 |
| GB | 2 159 971 | 12/1985 |
| JP | 52-82509 | 7/1977 |
| JP | A-62-22686 | 1/1987 |
| JP | 63-296982 | 12/1988 |
| JP | 01238984 | 9/1989 |
| JP | 581520 | 9/1993 |
| JP | 08100380 | 4/1996 |
| JP | 08-02064 | 8/1996 |
| WO | WO-A-90/13063 | 11/1990 |
| WO | WO 92/00852 | 1/1992 |
| WO | WO95/21739 | 8/1995 |
| WO | WO 99/56948 | 11/1999 |
| WO | WO 00/20218 | 4/2000 |

OTHER PUBLICATIONS

High–Technology Applications of Organic Colorants, Plenum Press, NY P. Gregory 1991.
The Theory of Coloration of Textiles, Society of Dyers and Colourists, West Yorkshire, England, Section Edidtion, A. Johnson, Editor, 1989.
Textile Printing, Society Dyers and Coulourists, West Yorkshiire, England, Second Edition, LWC Miles, Editor, 1994.
LB Schien, Electrography and Development Physics, Springer Series in Electrophysics 14 Springer–Verlag, 1988.
Robert Ulichney, Digital Halftoning, The MIT Press, 1990.

Primary Examiner—John Goodrow
(74) Attorney, Agent, or Firm—B. Craig Killough

(57) ABSTRACT

A reactive toner that is energy-activated is printed by means of an electrographic device such as a laser printer. The reactive toner is printed onto a substrate. Toner components that cross-link and bond the printed toner permanently onto the substrate, or another substrate through a transfer process, are activated by the application of energy to react after printing. Reaction of the energy-activated components may be inhibited with blocking or protecting agents. The image is permanently bonded onto the substrate when the protection provided by the protecting agents is removed by the application of energy to the printed toner. The toner may comprise energy-activated components, colorants, color enhancing polymeric materials, binder resins, internal and external additives such as waxes and charge control agents. The energy-activated components have multiple functional groups that react with active hydrogen, components that contain active hydrogen, or components that are capable of conversion to active hydrogen containing groups.

21 Claims, No Drawings

U.S. PATENT DOCUMENTS

| | | |
|---|---|---|
| 5,149,367 A | 9/1992 | Reuter et al. |
| 5,196,030 A | 3/1993 | Akerblom et al. |
| 5,246,518 A | 9/1993 | Hale et al. |
| 5,248,363 A | 9/1993 | Hale et al. |
| 5,250,121 A | 10/1993 | Yamamot et al. |
| 5,270,363 A | 12/1993 | Kluger et al. |
| 5,302,223 A | 4/1994 | Hale et al. |
| 5,315,885 A | 5/1994 | Szinyei |
| 5,326,622 A | 7/1994 | Yamane et al. |
| 5,380,769 A | 1/1995 | Titterington et al. |
| 5,411,931 A | 5/1995 | Kung |
| 5,418,018 A | 5/1995 | Rudder et al. |
| 5,429,841 A | 7/1995 | Batlaw et al. |
| 5,431,501 A | 7/1995 | Hale et al. |
| 5,470,818 A | 11/1995 | Nakamura et al. |
| 5,471,234 A | 11/1995 | Katano et al. |
| 5,534,052 A | 7/1996 | Mennicke et al. |
| 5,542,972 A | 8/1996 | von der Eltz et al. |
| 5,556,935 A | 9/1996 | Traubel et al. |
| 5,558,969 A * | 9/1996 | Uyttendaele et al. ....... 430/124 |
| 5,563,195 A | 10/1996 | Namba et al. |
| 5,575,877 A | 11/1996 | Hale et al. |
| 5,607,482 A | 3/1997 | Reiff et al. |
| 5,612,119 A | 3/1997 | Olsen et al. |
| 5,640,180 A | 6/1997 | Hale et al. |
| 5,643,709 A | 7/1997 | Kamio et al. |
| 5,645,888 A | 7/1997 | Tierrington et al. |
| 5,646,090 A | 7/1997 | Tamura et al. |
| 5,650,805 A | 7/1997 | Shimomura et al. |
| 5,665,676 A | 9/1997 | Nakamura et al. |
| 5,679,198 A | 10/1997 | Olsen et al. |
| 5,718,793 A | 2/1998 | Inamoto et al. |
| 5,725,646 A | 3/1998 | Krishman et al. |
| 5,748,204 A | 5/1998 | Harrison |
| 5,778,789 A | 7/1998 | Krishnan et al. |
| 5,785,790 A | 7/1998 | Olsen et al. |
| 5,822,671 A | 10/1998 | Takama |
| 5,853,861 A | 12/1998 | Held |
| 5,886,091 A | 3/1999 | Harris et al. |
| 5,919,592 A | 7/1999 | Yaghuci et al. |
| 5,978,077 A | 11/1999 | Koerner et al. |
| 5,981,077 A | 11/1999 | Taniguchi |
| 5,985,503 A | 11/1999 | de Beeck et al. |
| 6,009,297 A | 12/1999 | Madeda et al. |
| 6,017,636 A | 1/2000 | Tada et al. |
| 6,020,054 A | 2/2000 | Masuda et al. |
| 6,028,178 A | 2/2000 | Metz et al. |
| 6,040,269 A | 3/2000 | Imoto et al. |
| 6,042,641 A | 3/2000 | Justice |
| 6,068,797 A | 5/2000 | Hunt |
| 6,074,794 A | 6/2000 | Fushimi et al. |
| 6,078,773 A | 6/2000 | Shimojo et al. |
| 6,096,475 A | 8/2000 | Hare et al. |
| 6,099,625 A | 8/2000 | Bradbury et al. |
| 6,103,041 A | 8/2000 | Wagner et al. |
| 6,103,042 A | 8/2000 | Hatada et al. |
| 6,103,441 A | 8/2000 | Tomita et al. |
| 6,105,502 A | 8/2000 | Wagner et al. |
| 6,143,454 A | 11/2000 | Thompson |
| 6,270,933 B1 | 8/2001 | Thompson |

* cited by examiner

ENERGY ACTIVATED ELECTROGRAPHIC PRINTING PROCESS

This application claims priority of pending application Ser. No. 09/977,918, filed Oct. 16, 2001.

This application claims priority on provisional application Ser. No. 60/275,228, filed Mar. 12, 2001.

This application is a continuation in part of application Ser. No. 09/556,176, filed Apr. 20, 2000 now U.S. Pat. No. 6,341,856 and is a continuation-in-part of application Ser. No. 09/156,871, filed Sep. 18, 1998, now U.S. Pat. No. 6,402,313 which is a divisional of Ser. No. 09/073,963, filed May 6, 1998, now abandoned which is a divisional of Ser. No. 08/309,933, filed Nov. 7, 1994 now U.S. Pat. No. 5,522,317 and a continuation-in-part of Ser. No. 09/322,737, filed May 28, 1999 now U.S. Pat. No. 6,348,939.

FIELD OF THE INVENTION

This invention relates to printing processes generally and is more specifically related to a method of printing an image using a reactive toner by means of an electrographic printer, wherein one or more components of the toner are activated and react subsequent to printing, by the application of energy to the printed image.

BACKGROUND OF THE INVENTION

The use of computer technology allows substantially instantaneous printing of images. For example, video cameras or scanners may be used to capture a color image on a computer. The image may then be printed onto substrates from the computer by any suitable printing means capable of printing in multiple colors, including mechanical thermal printers, ink jet printers and electrophotographic or electrostatic printers. These printing technologies are widely practiced and well understood. The methods for making full color inks and toners are also well documented (L. B. Schein, "*Electrophotography and Development Physic*"; Springer Series in Electrophysics 14; Springer-Verlag, 1988). The substrates for these conventional applications, however, are limited to those that the printers can handle, invariably, smooth metal, plastic or papers of limited thickness.

Other techniques are well known in the art for printing onto clothing, other textile materials, and other objects including silk screening, digitally produced sublimation transfers, and mechanically bonded thermal transfers. For example, a process of thermal transfers, wherein the ink mechanically bonds to the substrate, is described in Hare, U.S. Pat. No. 4,773,953. The resulting mechanical image, as transferred, is a surface bonded image with a substantial 'hand' or a raised, plastic-like feel to the touch and relatively poor dimensional stability. In addition, the entire sheet is transferred with the non-imaged area as well, but without involving any chemical bonding or cross-linking process (U.S. Pat. Nos. 6,103,042, 5,978,077, 5,985,503, 4,066,802, 4,064,285, 5,981,077, 6,017,636, DE-A 27,27,223, EP-A 466,503, JP-A 63296982, WO 90/13063). It is also known through U.S. Pat. Nos. 5,785,790, 5,679,198, and 5,612,119 a screen printed support sheet, which may have an embedded layer of microspheres, printed with one or more layers of two-component colors based on polyester resin and an isocyanate hardener. The microspheres may have a reflective layer to allow the transferred image printed thereon to reflect light. If more than one color layer is printed onto the microspheres, then a two-component extender or glue that contains polyester is covered on top of each color layer. On top of the extender layer or single-color layer is applied a powder of polyester or polyamide elastomer, which is then fused into the color layer. Instead of screen printing, a color copier using a two-component toner may be used for applying the color coatings. The color coatings are subsequently covered with this elastomeric powder, which is then fused into the layer prior to transfer.

Conventional heat-melt thermal printing uses primarily non-active wax or wax-like materials such as hydrocarbon wax, carnauba wax, ester wax, paraffin wax, hot-melt resin, thermoplastic, or polymeric materials, etc. as heat-melt material. The resulting image has poor permanency since the conventional wax materials are not chemically bonded or otherwise permanently grafted to the substrate, but are temporarily and loosely bound to the final substrate by the melting of wax materials during the transfer process. The resulting image is not durable, with the wax materials being washed away during laundering of textile substrates on which the image is transferred, along with the dyes or colorants that form the image in the thermal ink layer.

Cooper, et al. in U.S. Pat. No. 4,216,283 teaches a xerographic process of dry image transfer with adhesive toner materials. The electrostatic image is developed with a low melting temperature dry toner composition containing a thermoplastic agent to give an image that is pressure-transferred to a receptor surface. This process uses both low melting temperature plasticizer and foamable microspheres to treat toner material in order to achieve the adhesiveness between toner and substrate. However, it does not chemically bind the toner to the final substrate and thus has poor image permanency.

The natural tendency of cotton fiber to absorb inks causes an image to lose its resolution and become distorted. Liquid inks, other than sublimation inks, wick, or are absorbed by, cotton or other absorbent substrates, resulting in printed designs of inferior visual quality, since the printed colors are not properly registered on the substrate. This is especially true when aqueous based ink paste is used for coating and fixing purposes as disclosed in U.S. Pat. No. 5,607,482. The substrates can be surface pre-coated or treated to improve the quality of images transferred onto substrates having a cotton component or other absorbent component with materials such as the coatings described in DeVries et al., U.S. Pat. No. 4,021,591. Application of polymer surface coating materials to the substrate allows the surface coating material to bond the ink layer to the substrate, reducing the absorbency of the ink by the cotton and improving the image quality. However, the gross surface coating on the substrate extends from the margins of the image after the image is applied to the substrate, and can be seen with the naked eye and adds hand to the fabric. Again the excess surface coating reduces the aesthetic quality of the printed image on the substrate. Furthermore, the surface coating tends to turn yellow with age, which is undesirable on white and other light colored substrates. Yellowing is accelerated with laundering, exposure to heat, chemicals, sunlight, or other harsh conditions. A method described in Hale, et al., U.S. Pat. No. 5,431,501, reduces the hand by printing a surface preparation material over the entire image, on the intermediate substrate, but not beyond the boundaries of the image. The image is then transferred from the medium to the final substrate by applying heat and pressure such that the surface preparation material permanently grafts the ink solids to the substrate.

The use of heat by electrographic devices such as laser printers and photocopiers presents the problem recognized in Hale U.S. Pat. Nos. 5,246,518, 5,248,363 and 5,302,223 of printing heat activated inks in a non-activated form by means of such devices. Laser printers and photocopiers in common use employ relatively high temperature fuser devices to thermally fuse or bind the ink to the substrate, since these devices anticipate that the image will be permanently bonded to the substrate which is printed by the device, and do not anticipate a subsequent thermal transfer of the printed image from the substrate.

Hale, et al., U.S. Pat. Nos. 5,555,813 and 5,590,600, describe the process of producing full color images electrostatically using sublimation toner. The images are printed onto a paper substrate and then heat transferred onto a polyester coated substrate at about 400° F. In sublimation transfer printing, solid dyes change to a gas at about 400° F., and have a high affinity for polyester at the activation temperature. Once the gasification bonding takes place, the ink is printed with substantial permanency, and is highly resistant to fading caused by environmental exposure, such as to light, or exposure to certain common chemical processes, such as cleaners or laundry products. However, these applications yield excellent results only when a synthetic material substrate is used, these dyes have a limited affinity for other materials, such as natural fabrics like cotton and wool.

In order to reduce the hand of a resin-formed image on fabric, a method described by Takama, U.S. Pat. No. 5,822,671, involves printing a resin-formed image onto a recording medium, such as cloth, followed by treatment of the recording medium with a plasticizer solution. The plasticizer penetrates between the resin molecules thereby imparting pliability to the fabric. Thompson, U.S. Pat. No. 6,143,454, discloses a dye sublimation toner using high molecular weight, cross-linked polymer resins that neither melt nor become tacky at temperatures needed to sublimate disperse dyes. In this way, it is reported that the toner itself does not transfer from the intermediate sheet to the final polyester substrate except the disperse dye component in the toner. In addition, this type of high molecular weight cross-linked resin may not fuse sufficiently to the intermediate sheet since the resin does not melt at the fuser roller temperature that is necessarily lower than sublimation temperature.

Gorondy, U.S. Pat. Nos. 4,421,515 and 4,421,517, describes a three-transfer step process of by using magnetic imaging toner containing a sublimation dye component. An image is generated by developing and transferring onto a continuous belt of thermally stable material; then such an image is transferred and laminated between two polymer films of polyester, polyamide, or polyvinyl chloride with heat and pressure. The lamination is then placed in contact with a fabric and heat is applied to subsequently sublimate and transfer the image to the polyester, polyamide, or the similar fabric.

Polyester resin materials have been used for various coating applications, as disclosed in U.S. Pat. No. 6,068,797. Recently polyester resins have been employed in toners in order to allow fusing at lower temperatures than traditional styrene-acrylic systems and since they have high levels of negative chargeability. Polyester resins also have a good resistance to plasticizers so that, for example, images placed in a polyvinyl chloride sleeve do not become blurred and indistinct. For example, DeMajo, et al. U.S. Pat. No. 5,112,715, and Bayley, et al. U.S. Pat. No. 5,486,444, describe the preparation of cross-linked polyesters that melt and are permanently fixed to the support medium. Matsumura, et al. U.S. Pat. No. 4,968,575, describe the preparation of rosin-containing polyesters for toners. However, it teaches the reduction of hydroxyl value by blocking terminal hydroxyl groups of polyester polyol molecules with a rosin compound in order to achieve desirable charging behavior of the toner. U.S. Pat. No. 6,103,041 teaches a method of digitally printing ink having components, whose functional groups are capable of reacting with active hydrogen, in an un-reacted state onto a substrate. The image is subsequently transferred or permanently fixed on the substrate by the application of heat and pressure, which activates the ink, and bonds the colorant to the substrate. The reactive compounds may be blocked with blocking agents, which are removed by the application of heat or other energy during activation of the ink. However, this method requires preparing a wax thermal ribbon comprising liquefiable hot-melt ink.

These techniques all suffer various drawbacks such as requiring specially coated substrates, producing images that suffer from excessive "hand", relatively low resolution, relatively low imaging speed, poor image quality, vibrancy, and/or permanency when the image is transferred to a fibrous natural material such as cotton or wool. Accordingly there remains a need for a digital printing process using inks or toners, and methods for making same, that provides for example, satisfactory electrical and physical properties of the toners during the printing of an image to an intermediate substrate before permanently affixing the image onto a fibrous natural or synthetic substrate with good quality, vibrancy, permanency and little 'hand'.

SUMMARY OF THE PRESENT INVENTION

The present invention relates to a multi-color digital printing method. More specifically, the present invention relates to an electrophotographic printing method to generate an image onto a substrate using reactive, energy-activated components in a dry or liquid toner. An image is printed onto a medium without reacting these components, and subsequently, the components are reacted to affix the image with substantial permanency and/fastness to the same substrate, or to another substrate. The toner may, or may not, comprise a colorant. The colorant may be printed in the form of an image by means of an additional printing step.

An objective of the invention is to provide an inexpensive electrophotographic printing process that will produce a permanent image onto fibrous material, natural or synthetic, with the liquid or dry toner remaining in non-reacted form during printing, but which will cross-link and bond to a substrate upon activating the reactive components with energy, including heat, during fixing, or during a transfer process. The toner or ink comprises compounds with functional groups that react with active hydrogen, such as isocyanate, and compounds with functional groups containing active hydrogen, or functional groups capable of conversion to active hydrogen containing groups.

It is yet another objective of the present invention to form an image onto a substrate with commercially applicable color vividness and color fastnesses. The toner may contain active polymeric or resinous material with functional groups to enhance the reactivity, as well as enhance the compatibility of the colorant to achieve outstanding color intensity and fastnesses. The toner may also contain hygroscopic fusing materials to enhance toner penetration to the final substrate, and cross-linking reactivity of the toner with the final substrate. The toner may also be comprised of pigments, organic or inorganic, and/or dyes, such as medium to high energy sublimation, disperse dyes, dye diffusion, heat sensitive dyes, or other dyes, any of which may be referred to herein as colorants. Without delivering toner material to non-imaged areas, it is yet another objective of the present invention to provide an imaging means onto fibrous material free of "hand" in the non-imaged areas hence substantially maintaining the original characteristics of the substrate and improving the final image quality.

To prevent premature or undesired reaction, the toner comprises protecting agents. The protecting properties of these agents are removed by the application of energy, such as heat energy, at a level that is at, or above, the required activation level, and may be above the temperature at which printing or fusing/fixation onto the medium occurs. In other words, the protecting agents and toner components with active functional groups are chosen such that the toner is not activated in either developing or fusing/fixation step in an electrophotographic printer during the process of printing an image onto the substrate. The image thus formed is transferred from the intermediate substrate to a final substrate on which the image is to permanently appear using heat and pressure to activate the toner. A heat press may be used to perform the transfer.

To prevent degradation of the substrate materials through processes such as oxidation or scorching, it is furthermore an objective of the present invention to minimize the transfer/fixing energy level, such as temperature, so that degradation will not occur, yet completion of the chemical reaction and permanent bonding to the substrate is ensured. A hygroscopic fusing agent may be used in the toner composition to enhance reactivity, and to shorten the transfer/fixing time of the process. Through the combination of the use of protected reactant and hygroscopic fusing agent, the chemical reaction can be initiated and substantially completed during the transfer/fixing process, in order to prevent the above mentioned degradation.

Alternatively, the image may be permanently fixed on the initial substrate by the application of heat, without transferring the image to a second substrate. The process produces an image on the substrate that is substantially permanent, vibrant, water-fast and colorfast.

DETAILED DESCRIPTION OF THE PREFERRED EMBODIMENT

In a preferred embodiment of the present invention, a toner or ink is produced comprising a colorant, resin, wax, heat-activated printing additive, hygroscopic fusing agent, external additive, internal additive, and components selected from each of two groups of reactive species.

The first reactive species is a nucleophilic compound capable of being cross-linked through active hydrogen containing groups, such as amine, amido, carboxylic acid, hydroxyl, thiol, urethane, or urea groups or functional groups that can be converted into active hydrogen containing functional groups, such as carboxylic acid derivatives, for example, anhydride groups. In addition, a final substrate containing active hydrogen, such as hydroxyl groups (cotton), amino groups (silk), or thiol groups (wool), may contribute, in full or partially, to this binding process and provide binding sites for the final image.

The second reactive species is an electrophilic cross-linking agent, which is able to cross-link the above nucleophilic compounds. The preferred cross-linking agents are isocyanates, isothiocyanates, or epoxy groups available for reaction through certain initiation processes, such as blocked polyisocyanates, internally blocked (sometimes referred to as blocking agent-free) isocyanate or polyisocyanates, or encapsulated polyisocyanates, which may be initiated by the application of heat. Furthermore, toner components such as colorants, resins, binders, hygroscopic fusing agents and other additives may also function as nucleophilic/electrophilic reactive compounds for fixation.

The proportions of reactive species from group one and two may be chosen to be present in a stoichiometric balance of reactive components. For example, the ratio of equivalents of isocyanate groups to the equivalents of active hydrogen-containing functional groups, depending on the functionality of the substrate, may range from 0.1:1 to 100:1, and is preferably 2:1.

In another embodiment of the present invention, the toner or ink may be comprised of a compound or compounds containing functional groups that react with active hydrogen, while the substrate contains a compound or compounds containing active hydrogen. For example, the toner or ink may contain isocyanate groups, and the final substrate contains active hydrogen, such as cellulose. As an extension of this concept, the toner or ink may contain a compound or compounds containing active hydrogen, while the substrate contains a compound or compounds with functional groups that react with active hydrogen.

In still another embodiment of the present invention, the two reactive groups may be contained in separate toners or inks. For example, a toner in one cartridge may contain a compound or compounds with functional groups that react with active hydrogen, while another cartridge may contain a compound or compounds containing active hydrogen.

In use, a video camera or scanning device may be used to capture an image. The image is provided to a computer. The computer directs an electrographic device, such as a laser printer or photocopier, to print the image. Other means of forming an image may be used, including images generated by software. Available computer design graphic software may be used, or still photography may be used. The design may be photographic, graphic artistic, or simply letters or words. The use of cyan, yellow and magenta toner compositions allow the printer to print in full color, or multi-color, designs. An optional black toner may be used. In addition, spot colors may be used to increase the color gamut.

An image is printed either directly onto the final substrate, or is printed onto an intermediate substrate and followed by a transfer process. Virtually any material which can be printed upon by a conventional electrographic device, such as a laser printer or photocopier, and which will withstand the fusing/fixation process may be used as a substrate. Various fusing/fixation processes include, but are not limited to, solvent, radiant, and combinations of heat and/or pressure. This substrate may be any paper commonly used with electrographic printers or copiers, however, standard bond paper may be used. Other substrates, such as cloth, or sheets of metal, plastic or glass, may be used if the printer can handle the substrate. A sheet of release paper may be used as an intermediate substrate if the image is transferred to a final substrate. A release paper may be a sheet coated with any low surface energy material, for example, a silicone polymer or fluorocarbon resin, such as polytetrafluoroethylene, or any other release agent, such as carboxymethlycellulose. The coat weight of release material is generally from 0.4–10 $g/m^2$ on the base sheet. Release force is typically used to describe the force it takes to remove something from the liner/base sheet, and may be subjectively described as 'easy' or 'tight'. The release force may be adjusted by coating formulations and resulting polymer characteristics, or by coat weight. Optimally, the release force is such that it is high ('tight') enough such that the toner adheres during and after the fusing step in the printer and any subsequent handling of the printed image, but not so high that the toner is not substantially released from the sheet during transfer to a final substrate ('easy release').

In transfer printing, once the image is printed onto an intermediate substrate, the image may be immediately and permanently transferred onto a final substrate, or the image may be transferred from the intermediate substrate to the final substrate at a later time. The design may be transferred onto a textile substrate, such as a shirt, or onto other substrates, such as metal, ceramic, wood, or plastic. A wide selection of preferred final substrates is possible, including, but not limited to, textiles, and especially natural, semi-synthetic or synthetic materials. Examples of natural textile materials include wool, silk, hair and cellulosic materials, particularly cotton, jute, hemp, flax and linen. Examples of synthetic and semi-synthetic materials include polyamides, polyesters, polyacrylonitriles and polyurethanes. Textile materials may be a blend of natural and synthetic fibers, as well.

Resins with one or more functional groups containing active hydrogen are preferably used as both nucleophilic compound and binder materials. Examples of functionalized resins are carboxylated polyester resin, homo-polymerized or co-polymerized, with about 2.0 equivalents of carboxyl groups and an average molecular weight above 3,000. Such carboxylated polyester may be linear, branched, or cross-linked, with an acid number between about 1 and about 100 mg KOH/g. Other examples of resins containing active hydrogen are hydroxylated or aminated polyesters, with a hydroxyl number of 10–200 mg KOH/g, preferably 20–120 mg KOH/g. Examples are Albester 3100 hydroxylated polyester (McWhorter), Crylcoat 291 hydroxylated polyester resin (UCB Chemicals), A-C 645 oxidized ethylene-based polymer (Honeywell) and Lexorez 1110-110 polyester polyol (Inolex). For applications where disperse or sublimation dyes are used as colorants, functionalized polyester resins are especially preferred, because of their high affinity to these colorants. An example of a group of binders with one or more functional groups containing active hydrogen is polyols. Polyols suitable for the present invention may have an average functionality of between two and six hydroxyl groups per molecule. In general, polyols or mixtures thereof may have an average molecular weight between 2,000 and 100,000, and preferably between 3,000 and 20,000. One skilled in the art will realize that other hydroxyl-containing materials may be used without departing from the spirit of the present invention. Other suitable active hydrogen-containing functional groups include amino, thiol, carboxylic acid and anhydride groups, and multi-functional compounds containing more than one different functional group. Other examples of materials having active hydrogen functional groups are sugar saccharides, polysaccharides and carbohydrate derivatives. Examples include cellulose and its derivatives, such as hydroxyethyl cellulose and hydroxypropyl cellulose, carboxymethlycellulose, glucose, cyclodextrin, starches, and their derivatives.

In order to achieve a successful cross-linking reaction within the toner materials and/or between the toner and final substrate, one or more hygroscopic fusing agents may be used. Hygroscopic fusing agents are materials that are solid at room temperature, and have one or more functional groups having active hydrogen that participates in the cross-linking reactions. These agents have a low molecular weight, narrow melting temperature, high melting index, and have a relatively low viscosity at temperatures above the melting point. Resins with two or more functional groups containing active hydrogen, such as the polyols mentioned above, may be suitable hygroscopic fusing agents. Preferably, these are materials with two or more active hydrogen functional groups, will have molecular weight from 60 to 1000, with a hydroxyl number of 5–1600 mg KOH/g, more preferably 60–200 mg KOH/g; melting temperature between 45° C. and 250° C. It is advantageous to have a hygroscopic fusing agent to assist toner penetration into the final substrate; but also, the hygroscopic fusing agent materially improves the chemical reactivity of the toner materials at the activation temperature. Furthermore, the hygroscopic fusing agent may act as a solubilizing agent for other toner ingredients. Examples of these materials include, but are not limited to: 12-hydroxystearic acid, 12-hydroxystearyl alcohol, 12-hydroxylauric acid, thymidine 5'-monophosphate acid, trimethylolpropane, trimethylolpropane propoxylate, trimethylolpropane ethoxylate, di(trimethylolpropane), trimethylolpropane tris(2-mercaptoacetate), 1,1,1-Tris(hydroxymethyl)propane, Dimethylolurea, trimethylhexamethylenediamine, isophorone-diamine, tris-(2-hydroxyethyl)isocyanurate (THEIC), 1,2-diphenylethylenediamine, 1,10-diaminodecane, 1,4,7-trimethyidiethylenetriamine, sorbitol, 1,4:3,6-dianhydro-D-sorbitol, Dianhydro-D-glucitol, 1,7-di-(sec.-butyl)-diethylenetriamine, 2,2-bis(hydroxymethyl)-1,3-propanediol, pentaerythritol ethoxylate, pentaerythritol propoxylate, pentaerythritol tetrakis(2-mercaptoacetate), neopentyl glycol, di-pentaerythritol, xylitol, 1,12-dodecanediol, 1,14-tetradecanediol, 1,16-hexadecanediol, 1,2-dodecanediol, 2,2,3,3,4,4,5,5,6,6,7,7,8,8,9,9-hexadecafluoro-1,10-decanediol, 2,2',2"-triaminotriethylamine; substituted and unsubstituted ureas and thioureas, such as urea, 1,1-dimethylurea, 1,3-dimethylurea, ethylurea, and thiourea; imines, such as polyethylene imine; amide, such as anthranilamide; imides, such as N-hydroxysuccinimide; substituted or unsubstituted 5- to 7-membered saturated or unsaturated heterocyclic ring structures that possess at least one of the atoms or groups O, S, N, NH, CO, CH=, or $CH_2$ as ring members, such as caprolactam, imidazole, 2-methylimidazole, isonicotinamide, and 5,5-dimethylhydantoin, resorcinol, 2-methylresorcinol, and succinic anhydride. One or more of these hygroscopic fusing agents may be used. The hygroscopic fusing agent is added to the toner formulation in an amount of 0–30% by weight, and will typically comprise 2–15% of the formulation by weight.

To prevent premature or undesired reaction, the nucleophilic and/or electrophilic functional groups may be protected either by chemical blocking, with or without blocking agents, either internally or externally, or by providing a physical barrier, such as by using encapsulating agents. A compound that is chemically blocked, or physically encapsulated, is referred to herein as "protected." With such protection, the second reactive species may be present with the first in the toner itself, or it may be printed onto the same area as the first reactive species from a separate ink or toner reservoir. The protecting agents may be removed after printing by the application of energy or heat. Other initiation processes may include, but are not limited to, radiation, hot steam, chemical, mechanical, and/or combinations thereof.

The toner is fixed onto the final substrate by removing protecting agent(s) on the reactive components by the application of energy, such as heat, hot steam, radiation, or pressure, or a combination of these, and allowing the first and second reactive species to react with each other and/or active hydrogen-containing groups on the final substrate. For example, the transfer step may be accomplished in this example by the application of heat at 200° C., and the simultaneous application of pressure, for twenty (20) seconds. Since fixation is independent of the printing process, images may be stored for long periods of time prior to activation and reaction.

The choice of protecting agents will depend, at least in part, upon the printer device to be employed in the process. For example, if a laser printer device uses heat and pressure to fuse the image to the substrate, and has an effective fuser roller temperature of approximately 150° C., a chemical blocking agent-containing reactive ingredient will be chosen such that the unblocking temperature is preferably above 150° C., and below the transfer temperature of, for example, 200° C. The blocking agent may have an unblocking temperature below the printers fusing temperature, and the choice of blocking agents will be dependent not only upon this fusing temperature, but the length of time the toner is exposed to the fusing temperature (dwell time). Examples of thus protected electrophilic reactive ingredients are internally (also known as blocking agent-free) and externally blocked polyisocyanates. An example of an internally blocked polyisocyanate is the isophorone diisocyanate (IPDI) product, Crelan VP LS 2147 from Bayer. Common examples of external blocking agents include phenols and substituted phenols, alcohols and substituted alcohols, thiols, lactams, mercaptams, primary and secondary acid amides, imides, aromatic and aliphatic amines, active methylene compounds, oximes of aldehydes and ketones and salts of sulfurous acid. An example of an externally blocked polyisocyanate is the F-caprolactam blocked Vestagon EP B 1400 from CreaNova.

It may be advantageous to include a catalyst to catalyze the cross-linking reaction of the first and second reactive ingredients. Examples of catalysts include tertiary amines, such as triethylene amine, triethylenediamine, hexahydro-N, N'-dimethyl aniline, tribenzylamine, N-methyl-piperidine and N,N'-dimethylpiperazine; heterocyclic nitrogen compounds, such as 1,5-diazobicyclo[4.3.0]non-5-ene and diazobicyclo[2.2.2]octane; alkali or alkaline earth metal hydroxides; heavy metal ions, such as iron(III), manganese (III), vanadium(V) or metal salts such as lead oleate, lead-2-ethylhexanolate, zinc(II) octanoate, lead and cobalt naphthenate, zinc(II)-ethylhexanoate, dibutyltin dilaurate, dibutyltin diacetate, and also bismuth, antimony and arsenic compounds, for example tributyl arsenic, triethylstilbene oxide or phenyldichlorostilbene. Particularly preferred are heterocyclic nitrogen compounds and dibutyltin catalysts.

The colorants used in the toner may be dyes or pigments, or a combination of these colorants. Suitable dyestuffs include, but are not limited to pigments, Acid Dyes, Direct Dyes, Reactive Dyes, Basic Dyes, Solvent Dyes, Disperse Dyes, Reactive Disperse Dyes, Sulphur Dyes, or Vat Dyes, or a combination thereof. Preferred are colorants containing a hydroxyl, amine, carboxylic, or other active hydrogen containing functional group that is capable of reacting with an electrophilic cross-linking agent without altering the desired hue. More preferred are those that contain at least one alkoxy or alkylamino group. Examples of such colorants include Disperse Red 55, Solvent Red 117 and Disperse Blue 3. Other examples are described, for example, in U.S. Pat. Nos. 4,749,784 and 6,159,250. These colorants can be used as a single component, or they can be mixed with more than one colorant of the same or different types, along with the rest of the toner or ink ingredients, to enhance the application quality. It is preferable to use a combination of both pigment and disperse dyes when various types of polyester, EVA, polyamide or the like are used either for binder resin, or as a reactive ingredient to achieve good color strength and lightfastness and wash fastness on the final substrate.

Pigments and dyes may be incorporated into a flush resin system for easier dispersion within the toner system. Examples of flushed colorants are Sun Phthalo Blue-Green Shade 15 and Sun Diaryl Yellow AAOT 14 (Sun Chemical), and Hostacopy E02-M 101 Magenta (Clariant). The toner may contain from 0–30% colorant. Colored toner will preferably contain between 4–15% colorant by weight.

In the present invention, non-functionalized polymeric or resinous materials may be incorporated into the toner to enhance either or both the thermal and mechanical properties of the toner, as well as the image vibrancy and durability. It is preferred to use these materials with an average molecular weight of 3,000–500,000 and glass transition temperature ($T_g$) ranges from 500–120° C., or melting temperature ($T_m$) ranges from 600–250° C., with good fusing performance and colorant dispersion or solubility for vivid color. Examples of resins include, but are not limited to, polyester or EVA, such as hot melt adhesives, homopolymer resins of soya-modified alkyd resins, modified phenolic resins, soya oil and linseed oil modified alkyds, methylphenol-formaldehyde, xylenol-formaldehyde; homopolymer of styrene and substituted styrene such as polystyrene, poly(p-chlorostyrene), polyvinyltoluene; and styrene copolymers such as styrene-vinylnaphthalene copolymer, styrene-acrylonitrile copolymer, styrene-vinyl methyl ether copolymer, styrene ethyl ether copolymer, styrene vinyl methyl ketone copolymer, styrene-butadiene copolymer, styrene-isoprene copolymer, styrene-acrylonitrile-indene copolymer, styrene-maleic acid copolymer and styrene-maleate copolymer. Other acceptable resins may include terpene resins, polyamide resins, polyvinyl chloride resins, aliphatic hydrocarbon resins, alicyclic hydrocarbon resins, aromatic petroleum resins, chlorinated paraffins and paraffin waxes. Generally, the toner composition will comprise from 0% to 95% in weight of the combined resinous materials. Preferably, the toner composition will comprise between 10 weight percent and 70 wt. % of the combined resinous materials.

Since the toner materials may not give an adequate charge magnitude, charge sign, rate of charging, or charge stability with time, internal and/or external charge control additives may be added into the toner composition to achieve desired charging behavior of the toner. Depending upon the specific printing mechanism of the electrographic printer, either positive or negative charge control additives can be used as necessary to the application. For example, negative charge control additives are preferred when functional polyesters with hydroxyl numbers 10–150 mg KOH/g are used. Colored or colorless quaternary ammonium salts and onium charge control agents can be used as positive charge control additives and metal complexes, while acidified carbon blacks or fumed silica surface additives are examples of negative charge control additives. The toner may comprise 0.01% to 10% charging additives, preferably 0.1% to 3% by weight.

Other printing additives may be added in the toner composition such as flow control agents or humidity scavengers. Combination of various charge control agents, flow control agents or other additives may also be used in order to enhance the performance of the toner in the present invention.

It is noted that electrophotographic systems of the present invention may use reactive toner in either a mono-component or a two-component developer. While the mono-component developer is composed of a toner only, the two-component developer is composed of a toner and a carrier (e.g. iron powder, ferrite powder, magnetite powder, etc.). Dual component dry electrographic copier/printer toners produced by the above examples are typically mixed in a ratio of one part toner of the desired color to ten parts of a carrier iron powder (for example, EFV 250/400, Nippon Teppun Co., Ltd.) to form developers in each of the desired colors. Mono-component toner may be made magnetic/nonmagnetic, and conductive/nonconductive to suit the engine design of the electrophotographic device. Magnetite and carrier materials can be added depending on the specific application. In mono-component applications, magnetite is added to enable the transport of the toner through the developer housing, and against the latent image, under magnetic control. The addition of magnetite also offers an advantage in two-component development, by controlling machine dirt even though the loading of such materials is much smaller than the single-component applications. The carrier provides basically two important functions in dual-component toner: charge generation and transport through the developer housing. The carrier can be comprised of either magnetic or nonmagnetic materials. Typical nonmagnetic carriers include particles such as glass beads, crystals of inorganic salts in crystal forms of sodium or potassium chlorides, metal particles and hard resin particles, and similar materials. Magnetic carrier particles include ferromagnetic materials comprised of iron, cobalt, or nickel in the form of an alloy or a mixture, and with or without film-forming resin coatings to improve the toner triboelectrical properties of the particles.

The toner may be prepared by using conventional mechanical techniques such as melt mixing techniques by using a roll mill or screw extruder, and/or pulverizer in which an air jet mill is used. Non-conventional techniques may be used, such as chemical polymerization or emulsion polymerization, to prepare a portion or the whole of the toner. In general, the toner can be produced by either technique with an average particle size from 0.1 to 25 microns.

In another embodiment of the present invention, the toners can also be used in triboelectrically or electrokinetically sprayed powder coatings as are used to coat surfaces of articles made from, for example, metal, wood, plastic, glass, ceramics, concrete, textile material, paper or rubber.

In another embodiment of the invention, the images created with the toners may also be created to be phosphorescent, iridescent, fluorescent, or have biological activity.

In another embodiment of the invention the full color toner images are made using, for example, only three of the cartridges, cyan (C), yellow (Y) and magenta (M). A process black (K) is produced from these three colors. The fourth cartridge, traditionally reserved for black, now contains a colorless toner that is transferred to the medium over the entire image area, but not beyond the image area prior to printing C, Y, M and/or K. This optional colorless toner may provide additional color vibrancy (V), wash fastness and/or lightfastness to the transferred image and/or may provide improved transfer efficiency of the image from an intermediate substrate to the final substrate. Alternatively, a set of five cartridges may be used, consisting, for example of C, M, Y, K and a colorless toner (V), or any spot colors, where again the colorless toner is printed onto the intermediate substrate over the entire imaged area, followed by the colored toners, or the colorless toner may be printed over the colored image. Any combination of colored toners may be used in this respect. More than one cartridge may contain this colorless toner.

The optional colorless toner (V) may comprise nucleophilic and/or electrophilic reactive species as with the colored toners. Colorless toner (V) may also comprise heat-melt compounds. Preferably these heat-melt compounds will also comprise nucleophilic reactive species, capable of reacting with, for example, polyisocyanate. Examples of such are oxidized polyethylene and polypropylene waxes, oxidized Fischer Tropsch waxes, and grafted maleic polymers. Addition of one or more additive previously described is advantageous, including hygroscopic fusing agents, charge control additives and silica. The colorless toner may be comprised of the same ingredients as any of the above described colored toners, except without colorant.

In another embodiment of the present invention, colorless toner (V) may be used to print over or under an image, only in the image area, or slightly beyond the image area for any type of image. For example, an image may be first printed with a toner or ink containing disperse, or sublimation, dyes onto a sheet or other substrate. The above described colorless toner is then printed over the image, covering the entire image area, but not beyond the image area. Alternatively, the colorless toner is first printed onto a sheet or other substrate over the entire image area, followed by printing an image with, for example, toners or inks containing disperse dyes. As a further extension of the scope of this invention, a printed image may be 'sandwiched' between layers of colorless toner. The overprinted and/or underprinted image is then transferred to a final substrate by application of energy, i.e., heat, to the backside of the sheet. The resulting transferred image has excellent image definition, color vibrancy and wash fastness when transferred to natural fiber material or a combination of natural and synthetic fabric. Any number of toner cartridges may contain the colorless toner (V). The colored image may be printed from the same electrophotographic printer as that used for the colorless toner, or from a separate electrophotographic printer, or from any other conventional or digital printer, including offset inkjet or wax thermal printers.

The colorless toner may be printed either over or under the colored image. When printed over the colored image, the colorless toner may be printed simultaneously, or at a later time, with a colored toner image. By "simultaneous," it is meant that, for example, the colored toner is in one or more cartridges, and the colorless toner is in the remaining cartridge or cartridges in the same printer and both are printed in 'one pass' through the printer. When printed under the colored image, the colorless toner may be printed prior to, or simultaneously with, the colored image.

The use of a color management process is preferred during the reproduction of the output using a digital printer so that the apparent color of a digital image on any of the final substrates will match the color of the original image. The color management process defines a method of converting the color values of a digital image from an input color space ($CS_i$) to the corresponding color values of a substrate color space ($CS_s$) while maintaining the visual color components. This process is unique for each combination of printer, final substrate, toner set, fixing/transfer device, and/or paper or intermediate substrate. Color correction and color management may be accomplished by the process described below. The term transfer/fixing is used to describe either a process of printing onto a medium, then transferring to a final substrate, or printing directly onto the final substrate and fixing.

Characterize the Output Device

Device characterization ensures that the density of the image on the target substrate matches the density requested by the print application. If the print application requests a 22% density square of black, a properly characterized device will produce output that will transfer to a black square of 22% density to the target substrate. If the device is not properly characterized, the final substrate will not accurately reproduce the target colors. For printed output, device characterization is accomplished by measuring the density of the printed output against a known target value. For the transfer process, device characterization must be extended to include the combination of device, colored toner set, colorless toner, and final substrate.

To characterize a device, toner, including the optional colorless toner layer in the V channel, and substrate combination, a table of input (stimulus) and adjustment (response) data pairs is built. This table represents the channel output values that need to be sent to the printer in order to reproduce the density on the output substrate that matches the density of the input value.

The substrate characterization process includes the combination of devices and materials associated with transfer or fixing of the image onto various final substrates. Considerations of parameters being used by these devices can also be critical to the quality of the image reproduction. Only the characterization of each combination of digital input/output devices, transfer/fixing devices, transfer mediums, and final substrates can ensure the required quality of the final product. Temperature, pressure, time, medium type, moisture level, second degree dot size change and color degradation, interrelation between toner with the media and final substrate, etc. are examples of such parameters.

The characterization table is built by sending a set of data points, (stimuli) to each color channel of the printing device. The data points represent a gradation of percentage values to be printed on each of the print device's color channels (from 0 to 100%). To make this process accurately reflect the final output, considerations must be given to potential application of colorless toner layer and transfer or fixation process to a final substrate before the response measurements are taken. Using a densitometer, the densities of each color channel on the transferred output are read from the substrate. The maximum density is recorded, and a linear density scale is computed using the same percentage increments as the stimuli gradation scale. The corresponding densities from each scale are compared. For each step of the gradation, a response value is calculated. The response value is the percentage adjustment, negative or positive, that the stimulus value will be adjusted so the target output density will match the stimulus density. These stimulus/response data points are entered into the characterization table.

The stimulus/response tables are built through repeated iterations of creating the target density squares on the substrate, measuring the density, and adjusting the associated response value. A stimulus response table must be built for each color channel of the output device.

Define the Substrate Color Gamut

The process of creating digital output on a printing device and transfer/fixing the output onto a final substrate can reproduce only a finite number of colors. The total range of colors that can be reproduced on any final substrate is defined as the substrate color gamut. The substrate color gamut will vary for every combination of output device, transfer temperature, transfer pressure, transfer time, transfer medium type, substrate moisture level, and final substrate. The process of defining the total range of colors that can be reproduced on an output substrate is called substrate profiling.

Profiling a non-transferred color gamut is accomplished by printing a known set of colors to a print media, measuring the color properties of the output, and building a set of stimulus/response data points. To accurately define the substrate color gamut, profiling must be performed after the digital image is output to the transfer media and transferred/fixed onto a substrate.

To quantify the substrate gamut, a computer application capable of creating colors using a device independent color space (typically the CIE XYZ or L*a*b color spaces) is used to generate a representative set of color squares. These color squares are modified by adjusting the density values of each color channel according to the data in the characterization table, output to the printing device, and transferring/fixing the image onto the target substrate.

A color target consisting of a set of CIE based color squares is used to measure the output gamut. The color target is converted into the print devices color space (i.e. RGB into CMYK), each channel has the percent values adjusted by the response value stored in the characterization table, sent to the output device, and transferred/fixed to the target substrate. The calorimetric properties of the color squares are measured using a calorimeter and stored as a set of stimulus/response data pairs in a color profile table. This table is the data source used by software algorithms that will adjust the requested color of a digital image so that the image, when viewed on the target substrate, has the same colorimetric properties as the original image.

A color profile table is created for each combination of output device, transfer temperature, transfer pressure, transfer time, transfer medium type, and final substrate that will be used to transfer the digital image onto the final substrate.

Rasterization and Output of the Digital Image

If the original digital image is not in the same color space as the output device, (for example an RGB image is output to a CMY device), the image is converted into the color space required by the output device. If the output device requires a black color channel, the K component (black) is computed by substituting equal amounts of the CMY with a percentage of the black color channel.

For each pixel in the image, the color value is modified. The new value is equal to the response value stored in the color profile table when the pixel's original color value is used as a stimulus. The percentage values of each of the pixel's color channels are adjusted by the amount returned from the characterization table when the pixel's color modified percentage value is used a stimulus.

The transfer process may require an additional channel, V, for application of a colorless layer over and/or under the entire imaged area. The V channel is computed by reading the color value for each pixel location for each of the gamut-corrected color channels, C, M, Y, and K. If there is color data in any of the C, M, Y, or K color channels for that pixel, the corresponding pixel of the V channel is set to 100%.

The CMYKV digital image is halftoned using methods describe in the book "Digital Halftoning" by Robert Ulichney. The CMYK channels are converted into halftone screens according to standard algorithms. The V channel will primarily be processed as a solid super cell, i.e. the entire cell will be completely filled. This will ensure that the colorless toner layer is completely covered by any of the CMYK halftone dots. The data for all of the color channels are then sent to the output device.

To provide for the ability to create a V channel border around the image, proximity enhancement may be applied to each V channel pixel that will be printed. If V channel output is required at pixel (x,y), the pixel proximity value is varied from −m to m, setting the V channel value at pixel (x+mask, y+mask) to 100%, where m is the width, in pixels, of the desired V channel border.

Although the present invention has been fully described by way of the above detailed description and examples, various changes and modifications will be apparent to those skilled in the art. The example formulations and applications are given by way of demonstration, and are not exhaustive of the application of heat activated dyes to accomplish the full color printing method of the present invention using dry or liquid toners and electrographic devices. Those skilled in the art will recognize, or be able to ascertain using no more than routine experimentation, many equivalents to the specific embodiments of the invention specifically described herein. Such equivalents are intended to be encompassed within the scope of the following claims.

EXAMPLE 1

A general dry toner formulation for use with the method of the present invention is as follows:

| Component | Weight % |
| --- | --- |
| Binder resin | 0–95 |
| nucleophilic binding material | 0–95 |
| electrophilic binding material | 0–95 |
| hygroscopic fusing agent | 0–30 |
| Colorant(s) | 0–20 |
| Additives | 0–10 |

EXAMPLE 2

An example of a yellow toner formulation is given below with a 0.1/10 NCO/OH ratio:

| Component | Weight % |
| --- | --- |
| Finetone 382 HMW[1] polyester | 15 |
| Fine-clad M8100[1] hydroxyterminated polyester | 45 |
| Vestagon BF1540[2] blocked isocyanate | 17 |
| Trimethylolpropane | 10 |
| Sun Diaryl Yellow AAOT 14[3] | 8 |
| Urea | 3 |
| Dabco T-12 Caatalyst[4] | 1 |
| Bontron E85[5] | 0.5 |
| Aerosil R812[6] | 0.5 |

[1]Reichhold
[2]Crea Nova
[3]Sun Chemical
[4]Air Products
[5]Orient
[6]Degussa

EXAMPLE 3

An example of a cyan toner formulation is given below with a 1:1 ratio of NCO to OH:

| Component | Weight % |
| --- | --- |
| Diacron ER-508[7] | 20 |
| Crylcoat 290[8] | 63 |
| Crelan VP LS 2347[9] | 7 |
| Hostacopy C 601[10] | 6 |
| Cibacet Blue F3R[11] | 2 |
| Dabco T-12 Catalyst[4] | 1 |
| Bontron E85[5] | 0.5 |
| Aerosil R972[6] | 0.5 |

[7]Dianal America Inc.
[8]UCB Chemicals
[9]Bayer
[10]Clariant
[11]Ciba

EXAMPLE 4

An example of a magenta toner formulation is given below with a 5:1 ratio of NCO to OH:

| Component | Weight % |
| --- | --- |
| Albester 3000[12] | 23 |
| 12 hydroxysteric acid | 5 |
| Butvar BS18[13] polyvinylbutyral | 5 |
| Crelan VP LS 2147[14] | 61 |
| Sun Quinacridone Magenta 122 PE[15] | 3 |
| Miketon Polyester Pink BL[16] | 2 |
| Aerosil E812[6] | 1.0 |

[12]Rucca
[13]Solutia Inc.
[14]Bayer
[15]Sun Chemical
[16]Mitsui Toatsu Dyes Ltd.

EXAMPLE 5

An example of a colorless (V) toner formulation is given below with a NCO/OH of 3.5:1:

| Component | Weight % |
| --- | --- |
| RuCote 107[17] | 45.5 |
| Ven-wax D5572[18] | 9 |
| Paraflint A1[19] | 9 |
| Vestanat B1358/100[20] | 26 |
| Urea | 9 |
| Aerosil R812[5] | 1.0 |
| Bontron E89[6] | 0.5 |

[17]Ruco Polymer
[18]Venture Chemicals
[19]Moore & Munger, Inc.
[20]CreaNova

What is claimed is:

1. A process of printing an image using an electrographic printer and an energy reactive toner, comprising the steps of:
    a. preparing a toner comprising at least one compound comprising active hydrogen, at least one compound comprising at least one functional group which is capable of reacting with said active hydrogen, and at least one protecting agent that protects said toner by inhibiting a reaction between said at least one compound comprising active hydrogen and at least one compound comprising at least one functional group which is capable of reacting with said active hydrogen during storage and printing of said toner;
    b. supplying an electrographic printer with said toner;
    c. printing a portion of said toner by means of said electrographic printer onto a first substrate so that printed toner is present on said first substrate; and
    d. subsequently applying energy to said printed toner to remove protection provided by said protecting agent, and reacting said at least one compound comprising active hydrogen and at least one compound comprising at least one functional group which is capable of reacting with said active hydrogen.

2. A process of printing an image using an electrographic printer and an energy reactive toner as described in claim 1, further comprising the step of transferring said printed toner from said first substrate to a second substrate when energy is applied to said printed toner to remove said protecting agent, wherein the reaction of said active hydrogen with said at least one compound comprising at least one functional group which is capable of reacting with said active hydrogen permanently bonds said printed toner to said second substrate.

3. A process of printing an image using an electrographic printer and an energy reactive toner as described in claim 1, wherein said toner further comprises a colorant, and wherein during printing of a portion of said toner, an image is formed on said first substrate by means of said printed toner.

4. A process of printing an image using an electrographic printer and an energy reactive toner as described in claim 2, wherein said toner further comprises a colorant, and wherein during printing of a portion of said toner, an image is formed on said first substrate by means of said printed toner, and wherein said image is permanently bound to said second substrate upon the reaction of said active hydrogen with said at least one compound comprising at least one functional group which is capable of reacting with said active hydrogen.

5. A process of printing an image using an electrographic printer and an energy reactive toner as described in claim 1, wherein said at least one compound comprising at least one functional group which is capable of reacting with said active hydrogen is an internally blocked isocyanate, wherein, upon the application of energy to said printed toner, protection provided by said internally blocked isocyanate is removed.

6. A process of printing an image using an electrographic printer and an energy reactive toner as described in claim 2, wherein said at least one compound comprising at least one functional group which is capable of reacting with said active hydrogen is an internally blocked isocyanate, wherein, upon the application of energy to said printed image, protection provided by said internally blocked isocyanate is removed.

7. A process of printing an image using an electrographic printer and an energy reactive toner as described in claim 3, wherein said at least one compound comprising at least one functional group which is capable of reacting with said active hydrogen is an internally blocked isocyanate, wherein, upon the application of energy to said printed toner, protection provided by said internally blocked isocyanate is removed.

8. A process of printing an image using an electrographic printer and an energy reactive toner as described in claim 4, wherein said at least one compound comprising at least one functional group which is capable of reacting with said active hydrogen is an internally blocked isocyanate, wherein, upon the application of energy to said printed image, protection provided by said internally blocked isocyanate is removed.

9. A process of printing an image using an electrographic printer and an energy reactive toner as described in claim 2, wherein said second substrate comprises active hydrogen which reacts with said at least one compound comprising at least one functional group which is capable of reacting with said active hydrogen.

10. A process of printing an image using an electrographic printer and an energy reactive toner as described in claim 4, wherein said second substrate comprises active hydrogen which reacts with said at least one compound comprising at least one functional group which is capable of reacting with said active hydrogen.

11. A process of printing an image using an electrographic printer and an energy reactive toner as described in claim 6, wherein said second substrate comprises active hydrogen which reacts with said at least one compound comprising at least one functional group which is capable of reacting with said active hydrogen.

12. A process of printing an image using an electrographic printer and an energy reactive toner as described in claim 8, wherein said second substrate comprises active hydrogen which reacts with said at least one compound comprising at least one functional group which is capable of reacting with said active hydrogen.

13. A process of printing an image using an electrographic printer and an energy reactive toner, comprising the steps of:
   a. preparing a toner comprising at least one compound comprising at least one functional group which is capable of reacting with active hydrogen, and at least one protecting agent that inhubits a reaction between hydrogen and said at least one compound comprising at least one functional group which is capable of reacting with active hydrogen during storage and printing of said toner;
   b. supplying an electrographic printer with said toner;
   c. printing a portion of said toner by means of said electrographic toner onto a first substrate so that printed toner is present on said first substrate;
   d. supplying a second substrate comprising active hydrogen; and
   e. applying energy to said printer toner and transferring said printed toner from said first substrate to said second substrate, thereby removing protection provided by said protecting agent, and reacting said active hydrogen from said second substrate with said at least one compound comprising at least one functional group which is capable of reacting with active hydrogen.

14. A process of printing an image using an electrographic printer and an energy reactive toner, comprising the steps of:
   a. preparing a toner comprising at least one compound comprising at least one functional group which is capable of reacting with active hydrogen, wherein said at least one compound comprising at least one functional group which is capable of reacting with active hydrogen is internally blocked;
   b. supplying an electrographic printer with said toner;
   c. printing a portion of said toner by means of said electrographic toner onto a first substrate so that printed toner is present on said first substrate;
   d. supplying a second substrate comprising active hydrogen; and
   e. applying energy to said printed toner and transferring said printed toner from said first substrate to the said second substrate, wherein protection provided by said internally blocked at least one compound comprising at least one functional group which is capable of reacting with active hydrogen is removed, and said active hydrogen from said second substrate reacts with said at least one compound comprising at least one functional group which is capable of reacting with said active hydrogen.

15. A process of printing a reactive toner using an electrographic printer as described in claim 13, wherein said toner further comprises a colorant, and wherein during printing of a portion of said toner, an image is formed on said first substrate by means of said printed toner.

16. A process of printing a reactive toner using an electrographic printer as described in claim 14, wherein said toner further comprises a colorant, and wherein during printing of a portion of said toner, an image is formed on said first substrate by means of said printed toner.

17. A process of printing an image using an electrographic printer and an energy reactive toner, comprising the steps of:
   a. preparing a toner comprising at least one compound comprising active hydrogen and at least one compound comprising at least one functional group which is capable of reacting with active hydrogen, wherein said at least one compound comprising at least one functional group which is capable of reacting with active hydrogen is internaly blocked;

b. supplying an electrographic printer with said toner;

c. printing a portion of said toner by means of said electrographic printer onto a first substrate so that printed toner is present on said first substrate; and d. applying energy to said printed toner, wherein protection provided by said internally blocked at least one compound comprising at least one functional group which is capable of reacting with active hydrogen is removed, and at least one compound comprising at least one functional group which is capable of reacting with said active hydrogen.

18. A process of printing a reactive toner using an electrographic printer as described in claim 17, wherein said toner further comprises a colorant, and wherein during printing of a portion of said toner, an image is formed on said first substrate by means of said printed toner.

19. A process of printing an image using an electrographic printer and an energy reactive toner as described in claim 17, further comprising the step of transferring said printed toner from said first substrate to a second substrate when energy is applied to said printed toner to remove protection provided by said internally blocked at least one compound comprising at least one functional group which is capab;e of reacting with active hydrogen, wherein the reaction of said at least one compound comprising active hydrogen with said at least one compound comprising at least one functional group which is capable of reacting with said active hydrogen permanently bonds said printed toner to said second substrate.

20. A process of printing an image using an electrographic printer and an energy reactive toner as described in claim 19, wherein said toner further comprises a coolrant, and wherein during printing of a portion of said toner, an image is formed on said first substrate by means of said printed toner, and wherein said image is permanently bound to said second substrate upon the reaction of said at least one compound comprising active hydrogen with said at least one compound comprising at least one functional group which is capable of reacting with said active hydrogen.

21. A process of printing an image using an electrographic printer and an energy reactive toner as described in claim 17, wherein said wherein said at least one compound comprising at least one functional group which is capable of reacting with active hydrogen is an internally blocked isocyanate.

\* \* \* \* \*